US012793367B2

(12) United States Patent
Tsuchiya

(10) Patent No.: US 12,793,367 B2
(45) Date of Patent: Nov. 10, 2026

(54) FEATURE SETTING APPARATUS, FEATURE SETTING METHOD, AND NON-TRANSITORY COMPUTER READABLE MEDIUM

(71) Applicant: NEC Corporation, Tokyo (JP)

(72) Inventor: Akira Tsuchiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 18/839,844

(22) PCT Filed: Mar. 30, 2022

(86) PCT No.: PCT/JP2022/016143

§ 371 (c)(1),
(2) Date: Aug. 20, 2024

(87) PCT Pub. No.: WO2023/188159

PCT Pub. Date: Oct. 5, 2023

(65) Prior Publication Data

US 2025/0173987 A1 May 29, 2025

(51) Int. Cl.
*G06T 19/20* (2011.01)
*G06F 3/04845* (2022.01)
*G06T 19/00* (2011.01)

(52) U.S. Cl.
CPC .......... *G06T 19/20* (2013.01); *G06F 3/04845* (2013.01); *G06T 19/003* (2013.01)

(58) Field of Classification Search
CPC ...................................................... G06T 19/20
See application file for complete search history.

(56) References Cited

U.S. PATENT DOCUMENTS

2004/0175039 A1* 9/2004 Miller ...................... G06F 18/28 707/999.107
2022/0086413 A1* 3/2022 Adachi ...................... G06T 7/73

FOREIGN PATENT DOCUMENTS

JP 2017-126240 A 7/2017
WO 2021/084661 A1 5/2021
WO 2021/084662 A 5/2021

OTHER PUBLICATIONS

International Search Report for PCT Application No. PCT/JP2022/016143, mailed on Jun. 28, 2022.

* cited by examiner

*Primary Examiner* — Shivang I Patel
(74) *Attorney, Agent, or Firm* — Sughrue Mion, PLLC

(57) ABSTRACT

Provided are a feature setting apparatus, a feature setting method, and a program capable of accurately and efficiently performing a work of designating a position of a feature present on a face surface by a user. A feature setting apparatus (1) includes a display control unit (2) that controls to display a first face image and a second face image side by side, and a movement operation reception unit (3) that receives a movement operation of a pointer. In a case where the pointer on one of the first face image and the second face image moves, the display control unit (2) performs control to display a marker at a position on the other face image corresponding to a position of the pointer to be moved in conjunction with the movement of the pointer.

14 Claims, 9 Drawing Sheets

FEATURE SETTING APPARATUS, FEATURE SETTING METHOD, AND NON-TRANSITORY COMPUTER READABLE MEDIUM

This application is a National Stage Entry of PCT/JP2022/016143 filed on Mar. 30, 2022, the contents of all of which are incorporated herein by reference, in their entirety.

TECHNICAL FIELD

The present disclosure relates to a feature setting apparatus, a feature setting method, and a program.

BACKGROUND ART

In the field of face authentication and the like, as a preparation for performing information processing using an image of a human face, work is sometimes performed in which a user designates a position of a feature such as a mole, a stain, or a scratch present on the surface of the human face. For example, in order to create a database of a collation system that specifies a person using a face image, a user who is a database creator may specify a position of a feature of a surface of each of a plurality of known persons. In addition, for example, in order to specify a person using a face image by the collation system, a user who is a person in charge of search sometimes inputs a position of a feature on a surface of a face of a person to be specified to the collation system. For example, Patent Literature 1 discloses a user interface for inputting a position of a feature on a surface of a human face in collation of the human face. In the user interface, the user looks at either a three-dimensional reference face image or a reference-face-developed image, and performs an input for determining the position of the feature. Further, in the user interface, when the position of the feature with respect to the three-dimensional reference face image is determined, the feature is also reflected in the reference-face-developed image.

CITATION LIST

Patent Literature

Patent Literature 1: International Patent Publication No. WO2021/084661

SUMMARY OF INVENTION

Technical Problem

In a case where the position of the feature existing on the surface of the face of a certain person is designated with respect to the face image in which the feature is not represented, the user can more accurately determine whether the position designated as the position of the feature is appropriate by confirming the position of the feature using a plurality of face images having different properties for the same person. For example, by confirming the position of the feature using a plurality of face images having different face directions, the user can more accurately determine whether the position designated as the position of the feature is appropriate. In the user interface described in Patent Literature 1, for example, when the position of the feature with respect to the three-dimensional reference face image of the face facing obliquely is determined, the feature is also reflected and displayed in the reference-face-developed image of the face facing forward. Therefore, the user can confirm whether the position designated as the position of the feature is appropriate using a plurality of face images having different face directions. However, in this user interface, after the position of the feature is once determined by the user, the reference-face-developed image of the face facing the front is displayed. Therefore, in a case where the user who has confirmed such a reference-face-developed image determines that the designated position is not appropriate, the user needs to perform the operation of designating the position again. This causes a decrease in work efficiency.

Therefore, one of the objects to be achieved by the example embodiments disclosed in this specification is to provide a feature setting apparatus, a feature setting method, and a program capable of accurately and efficiently performing a work of designating a position of a feature present on a face surface by a user.

Solution to Problem

A feature setting apparatus according to a first aspect of the present disclosure includes:

- a display control means for performing control to display a first face image and a second face image; and
- a movement operation reception means for receiving a movement operation of a pointer,
- in which in a case where the pointer on one of the first face image and the second face image moves, the display control means performs control to display a marker at a position on an other face image corresponding to a position of the pointer to be moved in conjunction with movement of the pointer.

A feature setting method according to a second aspect of the present disclosure includes:

- displaying a first face image and a second face image;
- receiving a movement operation of a pointer;
- in a case where the pointer on one of the first face image and the second face image moves; and
- displaying a marker at a position on an other face image corresponding to a position of the pointer to be moved in conjunction with movement of the pointer.

A program according to a third aspect of the present disclosure for causing a computer to execute:

- a display control step of controlling to display a first face image and a second face image; and
- a movement operation reception step of receiving a movement operation of a pointer,
- in which in the display control step, in a case where the pointer on one of the first face image and the second face image moves, a marker is controlled to be displayed at a position on an other face image corresponding to a position of the pointer to be moved in conjunction with movement of the pointer.

EXAMPLE EMBODIMENT

Outline of Example Embodiments

First, an outline of an example embodiment will be described.

Figure 1:
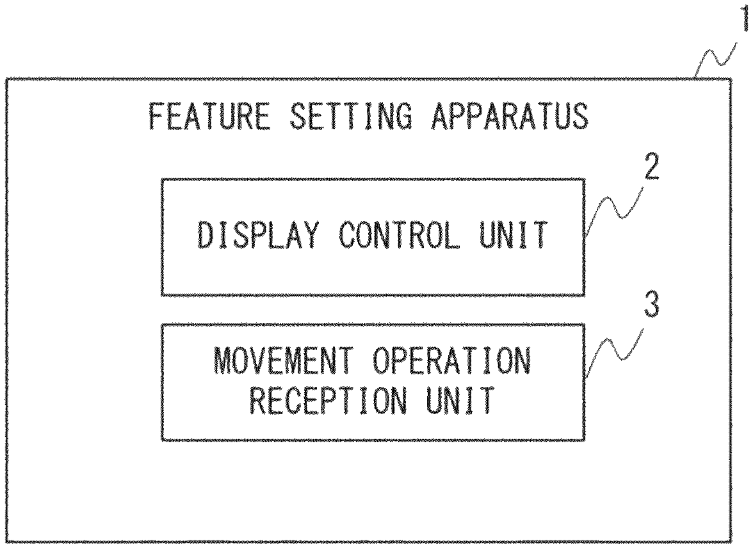
FIG. 1 is a block diagram illustrating an example of a configuration of a feature setting apparatus according to an outline of an example embodiment.

FIG. 1 is a block diagram illustrating an example of a configuration of a feature setting apparatus 1 according to an outline of an example embodiment. As illustrated in FIG. 1, the feature setting apparatus 1 includes a display control unit 2 and a movement operation reception unit 3. The feature setting apparatus 1 is an apparatus used for work in which a user designates a position of a feature existing on a surface (that is, the facial skin) of a human face. The feature existing on the surface of the human face is, for example, a feature appearing on the skin surface such as moles, freckles, tattooing, birthmarks, wrinkles, dimples, scars, warts, bumps, irregularities of the skin, and discolored parts of the skin. These features serve as facial marks, and thus can be used, for example, for face matching. Hereinafter, each component of the feature setting apparatus 1 will be described.

The display control unit 2 performs control to display a first face image and a second face image. More specifically, the first face image and the second face image are face images having different properties for the same person. For example, the first face image and the second face image may be an image of a face facing a first direction and an image of a face facing a second direction. Here, the first direction may be freely changed. In other words, the first direction may be a variable direction. In this case, for example, the display control unit 2 performs control to display an image of a face in a direction set on the basis of a user operation or the like as the first face image. The second direction may be a fixed direction. For example, the second face image may be an image of a face facing the front. However, it is sufficient that the first direction and the second direction are different directions, and the above-described limitation is not necessarily required.

The movement operation reception unit 3 receives a movement operation of a pointer. The user points at an arbitrary position on the screen including the first face image and the second face image with a pointer using a pointing device such as a mouse. The movement operation reception unit 3 receives such a moving operation of the pointer by the user via an input device.

In a case where a pointer on one of the first face image and the second face image moves, the display control unit 2 performs control to display a marker at a position on the other face image corresponding to a position of the moving pointer in conjunction with the movement of the pointer. That is, in a case where the position of the pointer according to the received movement operation is on the first face image, the display control unit 2 executes processing of displaying the marker in real time at the position on the second face image, that is, at the position where the face portion existing at the position pointed by the pointer exists. Note that displaying the marker in real time does not mean not allowing a difference in display timing, but means that the marker is displayed corresponding to the position of the pointer on the other image by using an operation (movement) of the pointer on one image as a trigger. It is more preferable that the span from the timing of movement of the pointer to the timing at which the marker is displayed at the corresponding position is shorter. This is because the positional relationship between both images can be grasped more responsively, and thus the position can be efficiently designated. Further, in a case where the position of the pointer according to the received movement operation is on the second face image, the display control unit 2 executes processing of displaying a marker in real time at a position on the first face image, that is, at the position where the face portion existing at the position pointed by the pointer exists. Note that the display control of the marker on the other face image by the display control unit 2 may be performed only in a case where the pointer is on the first face image or only in a case where the pointer is on the second face image. This marker is a display indicating where the temporary position is located on the other face image in a case where the position pointed by the pointer on one face image is set as the temporary position of the feature. In other words, in a case where the position pointed by the pointer on one face image is set as the temporary position of the feature, the marker is a display indicating the position equivalent to the temporary position on the one face image on the other face image.

Using such a feature setting apparatus 1, the user performs an operation of determining the position pointed by the pointer as the position of the feature existing on the surface of the face.

Figure 2:
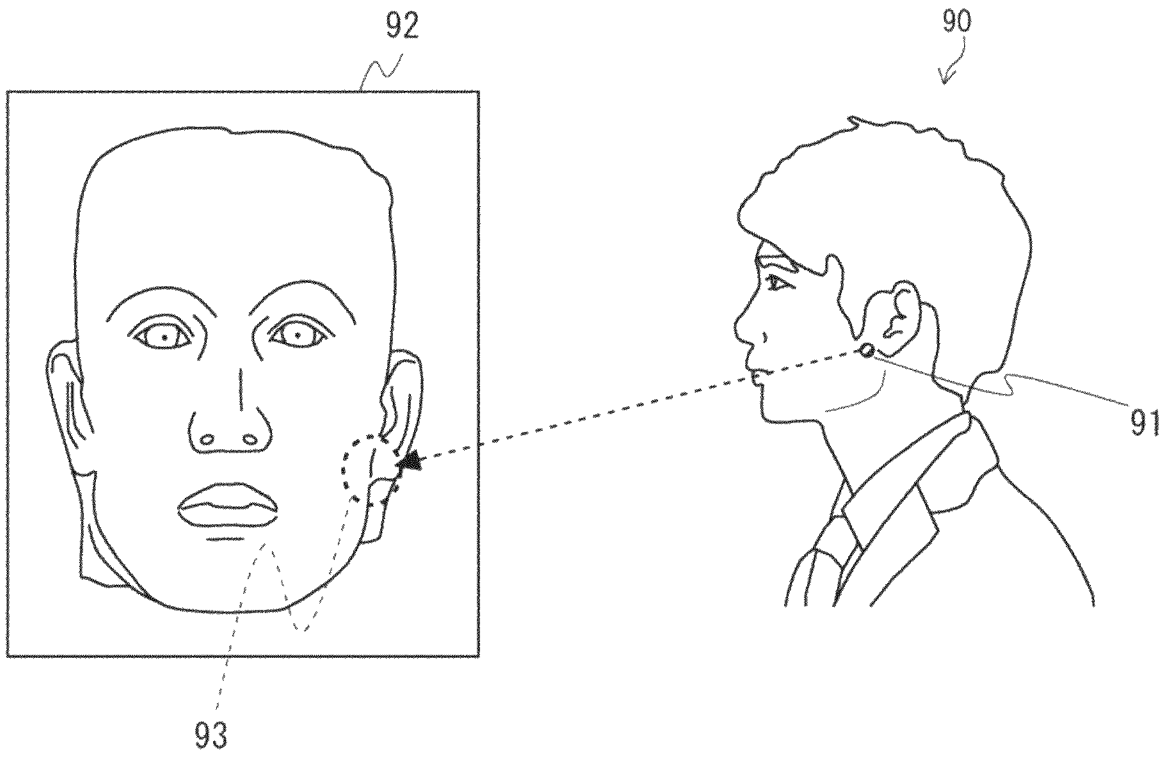
FIG. 2 is a schematic diagram for explaining a work of designating a position of a feature of a face of a person on a face image.

Here, a work of designating the position of the feature of the face of the person on the face image will be considered. FIG. 2 is a schematic diagram for explaining a work of designating the position of a feature 91 of the face of a person 90 on a face image 92. In this example, the feature 91 is on the left face surface of the person 90. When the position of the feature 91 is to be designated using only the face image 92 facing the front as illustrated in FIG. 2, a rough range 93 in which the feature 91 can exist can be designated, but it is difficult to designate an accurate position. This is because the left face surface where the feature 91 exists corresponds to the face surface inclined in the depth direction in the drawing of the face facing the front, and thus the left face surface is drawn in a contracted manner. That is, it is difficult for the user to designate an accurate position of the feature 91 on the narrowly drawn left face surface. On the other hand, if the position of the feature 91 is designated using the face image in which the person 90 faces sideways instead of the face image 92, the left face surface where the feature 91 exists is drawn widely, so that the position can be designated relatively easily. However, when an attempt is made to designate the position of the feature 91 only with a face image (for example, a face image facing sideways) facing one direction, it may be difficult to designate an accurate position. Specifically, this is a case where it is desired to determine the relative positional relationship with other parts of the face of the person 90 and then to confirm the position of the feature 91. In this case, it is preferable to determine the position of the feature 91 with reference to an image of a face direction in which a positional relationship between other parts and the feature 91 becomes clear. Note that the other parts may be a component of the face commonly present in a human face, such as an eye, an eyebrow, a nose, a mouth, an ear, or the like, or may be another feature whose position is already determined. In the above-described example, the positional relationship between the part present on the right face surface and the feature 91 is easy to understand by using the face image 92 of the face facing the front, but is difficult to understand only by the face image facing sideways. Therefore, in order to designate an accurate position, it is preferable to use images of a face in different directions. According to the feature setting apparatus 1, as described above, since the first face image and the second face image are used, it is possible to designate an accurate position.

In particular, according to the feature setting apparatus 1, the user can confirm in real time which position in the second face image (first face image) corresponds to the position pointed by the pointer in the first face image (second face image), and then can determine the position of the feature. Therefore, after the position of the feature is determined with respect to the first face image (for example, an image of a face directed in a certain direction), it is possible to suppress the trouble that may occur when the position is confirmed with the second face image (for example, a face image facing in another direction) having a property different from that of the first face image. That is, it is possible to suppress the occurrence of a situation in which the user notices an error in the determined position and performs the work again. Therefore, according to the feature setting apparatus 1, it is possible to accurately and efficiently perform the work of designating the position of the feature existing on the surface of the face by the user.

Note that, in the above description, the feature setting apparatus 1 having the configuration illustrated in FIG. 1 has been described, but an aspect for obtaining the above effect is not limited to the apparatus. For example, similar effects can be obtained in a feature setting method including the above-described processing of the feature setting apparatus 1, a program for performing the above-described processing of the feature setting apparatus 1, or a non-transitory computer readable medium storing the program.

Hereinafter, the example embodiment of the present disclosure will be described in detail with reference to the drawings. Note that in the description and drawings to be described below, omission and simplification are made as appropriate, for clarity of description. In each drawing, the similar components are denoted by the same reference signs, and redundant description will be omitted as necessary.

First Example Embodiment

Figure 3:
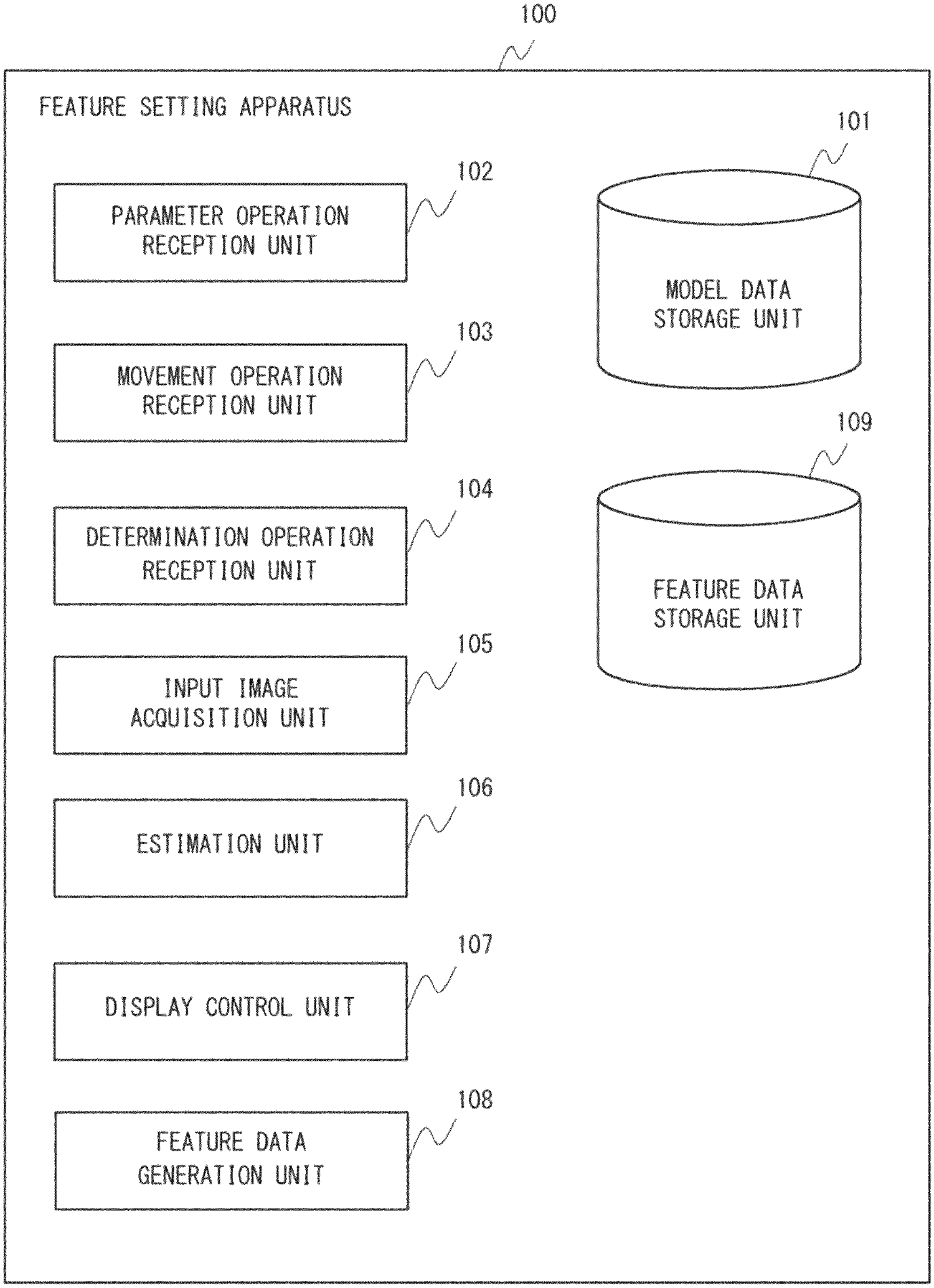
FIG. 3 is a block diagram illustrating an example of a functional configuration of a feature setting apparatus according to a first example embodiment.

FIG. 3 is a block diagram illustrating an example of a functional configuration of a feature setting apparatus 100 according to a first example embodiment. The feature setting apparatus 100 is an apparatus corresponding to the feature setting apparatus 1 of FIG. 1. The user uses the feature setting apparatus 100 to perform an input for designating the position of a feature of a face. Note that, in the present example embodiment, the user designates the position of the feature of the face of the person appearing in the face image while viewing the face image input to the feature setting apparatus 100 and displayed on the screen. However, the user may designate the position of the feature of the face of the person while viewing the actual person, or may designate the position of the feature of the face of the person while viewing the photograph of the person printed on the paper medium. In these cases, the processing of acquiring the input image, the processing of displaying the input image, and the like in the processing of the feature setting apparatus 100 to be described later can be omitted.

As illustrated in FIG. 3, the feature setting apparatus 100 includes a model data storage unit 101, a parameter operation reception unit 102, a movement operation reception unit 103, a determination operation reception unit 104, an input image acquisition unit 105, an estimation unit 106, a display control unit 107, a feature data generation unit 108, and a feature data storage unit 109. These will be described below.

The model data storage unit 101 stores three-dimensional data of a human face (head) generated in advance. That is, the model data storage unit 101 stores a three-dimensional model of the face. More specifically, the model data storage unit 101 stores data representing a three-dimensional computer graphics (CG) model of a human face. Note that the model data storage unit 101 may store three-dimensional data of the face of a fictitious person or may store three-dimensional data of the face of a real person. Note that the three-dimensional data of the face of the fictitious person is, specifically, for example, three-dimensional data of an average face that is a face having an average shape and having face components (eyes, eyebrows, nose, mouth, ears, etc.) arranged at average positions. Note that the model data storage unit 101 may store three-dimensional data of the average face for each predetermined group. Note that the group may be a group by sex, a group by age, a group by race, or the like. In addition, the model data storage unit 101 may store the three-dimensional data of the faces of a plurality of persons as the three-dimensional data of the faces of the real persons. Note that the three-dimensional data is created in advance from data obtained by measuring or imaging the human face (head), for example, and is stored in the model data storage unit 101.

Although the model data storage unit 101 is included in the feature setting apparatus 100 in the configuration illustrated in FIG. 3, the model data storage unit 101 may be realized in another apparatus communicably connected to the feature setting apparatus 100 via a network or the like.

The parameter operation reception unit 102 receives a change operation for a parameter for drawing the first face image displayed in a first drawing region 901 described later. The user performs a change operation for a parameter as necessary using an input device 151 described later. This operation may be an operation for changing a parameter, may be an operation for inputting a value of a parameter, or may be a predetermined operation by a pointing device.

In the present example embodiment, as parameters that can be changed by the user, there are a parameter for controlling rotation of the three-dimensional model, a parameter for setting a viewpoint for drawing the three-dimensional model as the first face image, and a parameter for setting an arrangement position of the face in the first face image. Note that the parameters changeable by the user may not be all of them, and may be only some of them.

The parameter for controlling the rotation of the three-dimensional model is a parameter for rotating the three-dimensional model of the face in the model space. In this example embodiment, the parameter for controlling the rotation of the three-dimensional model includes a parameter for controlling the rotation about the x axis, a parameter for controlling the rotation about the y axis, and a parameter for controlling the rotation about the z axis in the model space. Note that the parameters for controlling the rotation of the three-dimensional model may not be all of them, and may be only some of them. By adjusting the parameter for controlling the rotation of the three-dimensional model, it is possible to display the first face image in which a face facing in an arbitrary direction is drawn. Therefore, the convenience of the user is improved. For example, the user can display a face in the same direction as the face direction of the input image as the first image, and then perform the operation of designating the position of the feature.

Specifically, the parameter for setting the viewpoint for drawing the three-dimensional model as the first face image is a parameter set for the camera arranged in the model space as the viewpoint for drawing. In this example embodiment, the parameter set for the camera includes a parameter for setting the camera position (that is, coordinates of the camera in the model space), but may include other parameters without being limited thereto. For example, the parameter set for the camera may include a parameter for setting the orientation of the camera in the model space, or may include a parameter for setting the angle of view of the camera. By adjusting the parameter for setting the viewpoint, a face can be drawn on the basis of an arbitrary viewpoint and displayed as the first face image. Therefore, the convenience of the user is improved. For example, the user can display, as the first image, a face depicted similarly to the depiction of the face in the input image, and then perform the operation of designating the position of the feature.

The parameter for setting the arrangement position of the face in the first face image is a parameter for translating the drawn face. In this example embodiment, the parameter includes a parameter for determining the position of the face in the horizontal direction (x-axis direction) and a parameter for determining the position of the face in the vertical direction (y-axis direction). Note that only one of the parameters for setting the arrangement position of the face may be used. The first face image in which the face is drawn at an arbitrary position can be displayed by adjusting the parameter for setting the arrangement position of the face. Therefore, the convenience of the user is improved. For example, the user can display a face depicted at a position similar to the position of the depiction of the face in the input image as the first image and then perform the operation of designating the position of the feature.

The movement operation reception unit 103 corresponds to the movement operation reception unit 3 in FIG. 1. The movement operation reception unit 103 receives a movement operation of a pointer. The user points at an arbitrary position on the screen of a graphical user interface (GUI) output by the control of the display control unit 107 with a pointer using an input device 151 (more specifically, a pointing device such as a mouse) to be described later. As will be described later, the GUI screen includes a first drawing region 901 in which a first face image is displayed and a second drawing region 902 in which a second face image is displayed.

The determination operation reception unit 104 receives an operation of determining the position pointed by the pointer as the position of the feature existing on the surface of the face. The user performs a determination operation of the position of the feature using an input device 151 to be described later. Specifically, the user performs a predetermined operation in the state of pointing to the position of the feature of the face of the person with a pointer on the face image displayed on the GUI screen, thereby determining the position of the feature. This operation may be an operation predetermined as an operation for determining the position of the feature, and may be an operation of clicking a predetermined button of the mouse or an input operation of a predetermined key of the keyboard. The determination operation of the position of the feature may be performed in a case where the pointer is on the first face image, or may be performed in a case where the pointer is on the second face image.

The input image acquisition unit 105 acquires a face image (hereinafter, also referred to as an input image) input to the feature setting apparatus 100. Specifically, the input image acquisition unit 105 acquires an image showing a person whose position of the feature on the surface of the face is to be determined. That is, the input image acquisition unit 105 acquires an image in which a feature appears on the surface of the face. Specifically, the input image is an image of a person captured by an imaging device such as a camera. The input image is displayed on the GUI screen by the display control unit 107. The user designates the position of the feature on the first face image or the second face image displayed on the GUI screen with a pointer while referring to the position of the face appearing in the displayed input image and the position of the feature on the surface of the face. Note that the input image acquisition unit 105 may acquire a plurality of face images of the same person as the input image. The plurality of face images may be images having different face directions. By referring to a plurality of images showing a face with different directions for the same person, the user can more appropriately designate the position of the feature on the first face image or the second face image. Note that, in this case, in order to easily confirm the position of the feature with the face in various directions, the display control unit 107 may perform control to simultaneously display a plurality of face images for the same person side by side, for example. However, the display control unit 107 may control to sequentially display a plurality of face images for the same person on the GUI screen.

The input image acquisition unit 105 may acquire the input image by receiving the input image from another apparatus, or may acquire the input image by reading from a storage device built in the feature setting apparatus 100 or a storage device connected to the feature setting apparatus 100.

The estimation unit 106 estimates the direction in which the face of the input image acquired by the input image acquisition unit 105 faces. That is, it is estimated in which direction and how much the face appearing in the input image is inclined from the face facing the front. The estimation unit 106 may estimate the facing direction of the face appearing in the input image using a known image recognition technology. For example, the estimation unit 106 estimates the direction in which the face appearing in the input image acquired by the input image acquisition unit 105 faces by using a machine learning model learned in advance by machine learning such as deep learning. The estimation result by the estimation unit 106 is used to determine the face direction of the first face image displayed in the first drawing region 901. That is, the estimation result by the estimation unit 106 is used to display an image of a face in the same direction as the face direction of the input image as the first face image. However, the estimation result of the estimation unit 106 is not necessarily used to determine the face direction of the first face image. In this case, the estimation unit 106 may be omitted in the feature setting apparatus 100.

Figure 4:
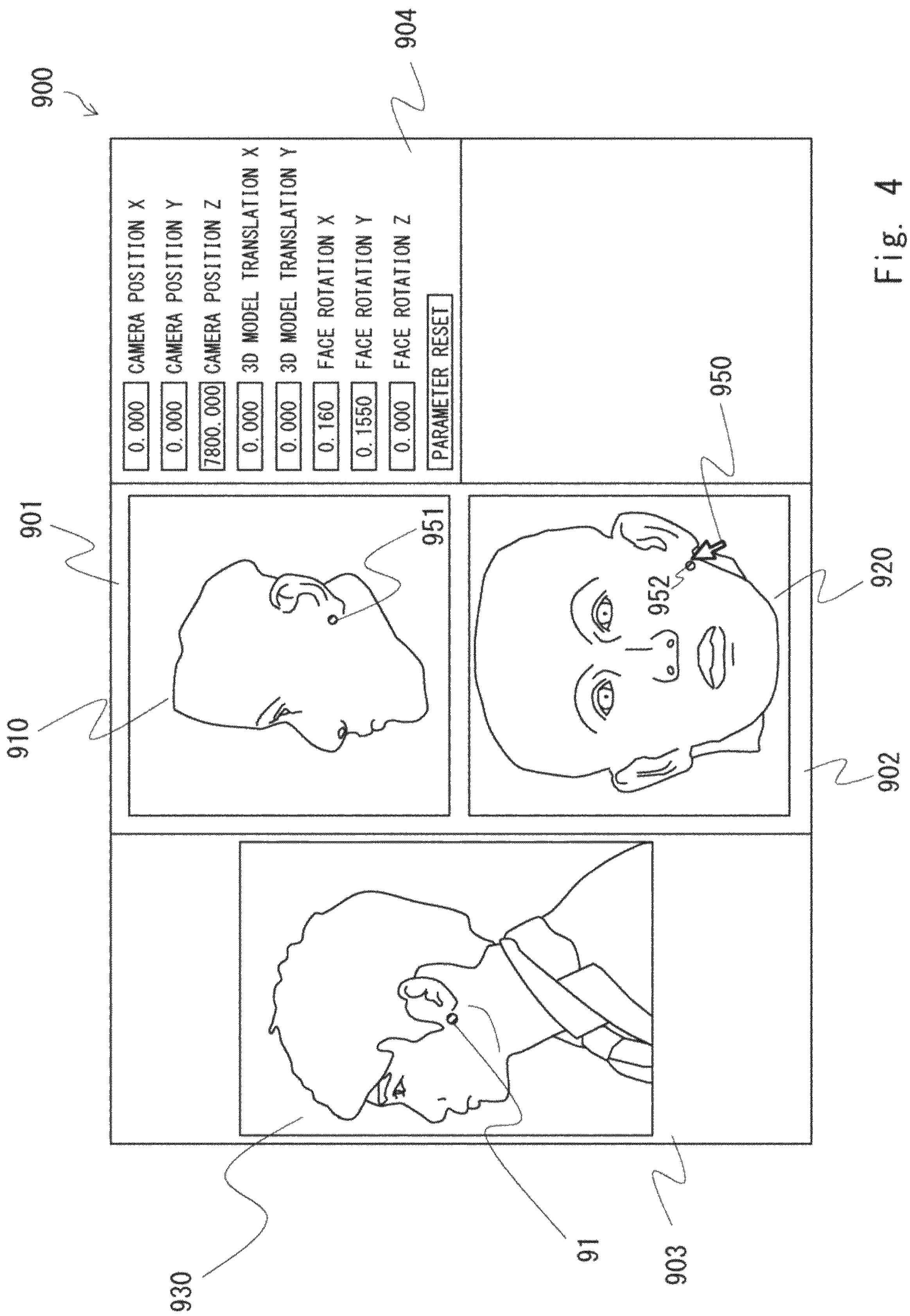
FIG. 4 is a schematic diagram illustrating an example of a GUI screen displayed on an output device by a display control unit according to the first example embodiment.

The display control unit 107 corresponds to the display control unit 2 in FIG. 1. Processing is performed such that a GUI screen that receives an input for designating the position of the feature present on the surface of the face of the person from the user is displayed on an output device 150 described later. FIG. 4 is a schematic diagram illustrating an example of a GUI screen 900 displayed on the output device 150 by the display control unit 107. As illustrated in FIG. 4, the GUI screen 900 includes a first drawing region 901, a second drawing region 902, an input image display region 903, and a parameter display region 904. In addition, the display control unit 107 performs control to display a pointer 950 at a position according to the movement operation received by the movement operation reception unit 103.

The input image display region 903 is a region where the input image acquired by the input image acquisition unit 105 is displayed. The display control unit 107 controls to display the input image acquired by the input image acquisition unit 105 in the input image display region 903. In a case where the input image acquisition unit 105 acquires a plurality of images of the same person, the display control unit 107 may display the plurality of images side by side in the input image display region 903. In the example illustrated in FIG. 4, an input image 930 of the person having the feature 91 on the cheek near the lower end of the left ear is displayed in the input image display region 903.

The parameter display region 904 is a region for displaying parameter values for drawing a first face image 910. The display control unit 107 performs control to display, in the parameter display region 904, the parameter value used for drawing the first image currently displayed in the first drawing region 901.

The first drawing region 901 is a region where the first face image 910 is drawn and displayed. The display control unit 107 generates an image in which a face facing the first direction is drawn on the basis of the three-dimensional data (three-dimensional model) of the face stored in the model data storage unit 101, and displays the generated image in the first drawing region 901. In a case where the model data storage unit 101 stores a plurality of three-dimensional models of the face, for example, the first face image 910 is generated using the three-dimensional model designated by the user. For example, the user selects, from among the plurality of three-dimensional models, a three-dimensional model corresponding to a person whose position of the feature of the surface of the face is to be determined. In this example embodiment, the first direction can be freely changed. That is, in this example embodiment, the first direction is a variable direction, and the user can freely change the first direction by changing the value of the parameter for drawing. In other words, the display control unit 107 performs control to display an image of a face in a direction set according to the operation received by the parameter operation reception unit 102 in the first drawing region 901 as the first face image 910.

The display control unit 107 draws the first face image 910 using stereoscopic projection. For example, the display control unit 107 arranges a viewpoint (camera) and a projection surface (plane) in a model space in which a three-dimensional model exists, and projects the three-dimensional model on the projection surface to draw the first face image 910.

Note that the display control unit 107 may perform control to display the first face image with the direction estimated by the estimation unit 106 as the first direction. That is, the display control unit 107 may generate an image in which a face facing the estimated direction is drawn on the basis of the three-dimensional model, and display the image as the first image. In this way, by displaying the image of the face facing the direction estimated by the estimation unit 106, it is possible to display, as the first face image, the image of the face facing the same direction as the direction of the face appearing in the input image. Therefore, the user does not need to perform the change operation for the parameter. Note that, for example, the display control unit 107 may use the default image of the first image, that is, the initial image of the first image, as the image of the face facing the direction estimated by the estimation unit 106. Thereafter, in a case where the parameter operation reception unit 102 receives a change operation for a parameter from the user, the display control unit 107 may perform control to draw a face image corresponding to the operation and display the face image as the first face image. For example, in a case where the user determines that the default image (initial image) is not appropriate, the user performs an operation of changing the parameter in order to change the display of the first face image to a desired image. In this manner, the display control unit 107 performs control to display the first face image drawn according to the parameter operable by the user. Therefore, the user can freely change the drawing of the face so that the user can easily input the feature, which improves convenience.

The second drawing region 902 is a region where a second face image 920 is drawn and displayed. The display control unit 107 generates an image in which a face facing the second direction is drawn on the basis of the three-dimensional data (three-dimensional model) of the face stored in the model data storage unit 101, and displays the generated image in the second drawing region 902. The display control unit 107 generates the second face image using the in three-dimensional model used to generate the first face image 910. In this example embodiment, the second direction is a fixed direction, and the second face image 920 is specifically an image of a face facing the front.

In the present example embodiment, the display control unit 107 performs control to display an image obtained by two-dimensionally developing the texture of the three-dimensional model as the second face image in the second drawing region 902. Specifically, the display control unit 107 executes, for example, UV development processing using the three-dimensional model, and generates a developed image of the face projected in a cylindrical shape as the second face image. In the image in which the texture of the three-dimensional model is developed two-dimensionally, as in the second face image 920 in FIG. 4, the side surface portion of the face is drawn to be extended as compared with the face image (see the face image 92 in FIG. 2) drawn by projecting the three-dimensional model with the face facing the front on a plane. That is, in the present example embodiment, an image in which a relatively wide region on the side surface of the face is drawn is displayed. Therefore, even in a case where the user designates the position of the feature of the face surface (for example, the side surface of the face) inclined in the depth direction using the face image in the front view, the user can designate the position in a relatively wide region. Therefore, even in such a case, the user can easily designate an accurate position.

As illustrated in FIG. 4, the display control unit 107 controls the input image 930, the first face image 910, and the second face image 920 to be displayed side by side. According to such a configuration, the user can designate the position of the feature on the first face image 910 or the second face image 920 using the pointer 950 while referring to the input image 930. Therefore, it is possible to compare the position of the feature appearing in the input image 930 with the position of the pointer 950 on the first face image 910 or the second face image 920 and to perform an operation of determining the position of the feature, which improves convenience.

The user performs an operation of moving the pointer 950 on the first face image 910 or the second face image 920 in order to designate the position of the feature. This operation is received by the movement operation reception unit 103 as described above. At that time, the movement operation reception unit 103 may receive the movement operation as follows. In a case where the pointer 950 exists in a portion having a drawing area smaller than that of other portions of the surface of the face among the portions of the surface of the face, the movement operation reception unit 103 may reduce the movement speed of the pointer 950 as compared with a case where the pointer 950 exists in the other portions. In other words, in a case where the pointer exists in a portion where the drawing area of the unit region is smaller than that of other portions, the movement operation reception unit 103 may reduce the ratio of the movement amount of the pointer to the physical operation amount by the user as compared with a case where the pointer exists in the other portions. More specifically, in a case where the pointer 950 exists in a portion where the drawing area of the unit region is smaller than that of other portions, the movement operation reception unit 103 reduces the movement speed (movement amount). Here, the unit region is a region of a surface (texture) of the three-dimensional model, and is a region having a unit area. The drawing area is an area of a region in an image drawn as the first face image 910 or the second face image 920. That is, the drawing area is an index indicating how large a region having a unit area on the three-dimensional model is drawn in the first face image 910 or the second face image 920. Therefore, the portion having a smaller drawing area than the other portions can also be referred to as a portion that is drawn to be contracted as compared with the other portions.

For example, in the first face image 910, a portion corresponding to the front surface has a smaller drawing area per unit region than a portion corresponding to the left side surface of the face. Therefore, for example, in a case where the pointer 950 moves in a region where a portion corresponding to the front surface of the face is drawn on the first face image 910, the movement speed of the pointer 950 decreases. For example, in the second face image 920, the portion corresponding to the side surface of the face has a smaller drawing area per unit region than the portion corresponding to the front surface of the face. Therefore, for example, in a case where the pointer 950 moves in a region where a portion corresponding to the side surface of the face is drawn on the second face image 920, the movement speed of the pointer 950 decreases.

By performing such control on the movement speed of the pointer 950, the movement speed of the pointer 950 decreases in a case where the position of the feature is designated in the contracted drawing region, and thus, the user can easily perform fine adjustment of the position of the pointer 950. Therefore, even in the case of designating the position of the feature in the contracted drawing region, the user can easily designate the accurate position.

The movement operation reception unit 103 may control the movement speed of the pointer 950 only in a case where the pointer 950 is on the first face image 910 or only in a case where the pointer is on the second face image 920. For example, in a case where the pointer 950 is on the second face image 920, the movement operation reception unit 103 may control the above-described movement speed, and in a case where the pointer 950 is on the first face image 910, the movement operation reception unit 103 may not control the above-described movement speed. In addition, whether to control the above-described movement speed may be determined according to an instruction from the user.

In a case where the pointer 950 on one of the first face image 910 and the second face image 920 moves, the display control unit 107 performs control to display a marker 951 at the position on the other face image corresponding to the position of the moving pointer 950 in conjunction with the movement of the pointer 950. That is, in a case where the pointer 950 exists on the first face image 910, the display control unit 107 performs control to interlockingly display the marker 951 in real time at a position on the second face image 920 corresponding to the position of the pointer 950. Similarly, in a case where the pointer 950 exists on the second face image 920, the display control unit 107 performs control to interlockingly display the marker 951 in real time at a position on the first face image 910 corresponding to the position of the pointer 950. Note that the position corresponding to the pointer 950 is a position on the face image where the pointer 950 does not exist, and refers to a position where a portion of the face existing at the position pointed by the pointer 950 is drawn. Note that the display control unit 107 may execute the real-time interlocking display of the marker 951 described above only in a case where the pointer 950 exists on the first face image 910, or only in a case where the pointer 950 exists on the second face image 920. In FIG. 4, the user moves the pointer 950 on the second face image 920. In this case, as illustrated in FIG. 4, the display control unit 107 controls to display the marker 951 at a portion corresponding to the portion pointed by pointer 950 on the first face image 910. Note that, as illustrated in FIG. 4, the display control unit 107 may perform control to display a marker 952 also at the position pointed by the pointer 950. In this example embodiment, the marker 951 and the marker 952 are images in which one point is drawn, but are not limited thereto, and may be other images. For example, the marker 951 and the marker 952 may be images imitating features.

Note that the display control unit 107 specifies the drawing position of the marker 951 by, for example, converting the position pointed by the pointer 950 on one face image to the position in the three-dimensional model that is the basis of the face image, and calculating the position in the other face image drawn on the basis of the three-dimensional model.

In FIG. 4, the user performs an operation of designating the position of the feature 91 on the second face image 920 while confirming the position of the pointer 950 (the position of the marker 952) on the second face image 920 and the position of the marker 951 displayed interlockingly on the first face image 910. This operation is received as a determination operation by the determination operation reception unit 104. The user may perform an operation of designating the position of the feature 91 on the first face image 910. In this case, the user performs an operation of designating the position of the feature 91 on the first face image 910 while confirming the position of the pointer 950 (the position of the marker 952) on the first face image 910 and the position of the marker 951 displayed interlockingly on the second face image 920. According to such processing of the display control unit 107, the user can determine the position of the feature 91 after confirming in real time the position pointed by the pointer 950 in the face image in a certain direction corresponds to which position in the face image in another direction. Therefore, it is possible to accurately and efficiently perform the work of designating the position of the feature 91 existing on the surface of the face by the user.

When the determination operation reception unit 104 receives the determination operation of the position of the feature 91, the feature data generation unit 108 generates feature data that is data representing the position of the feature 91. The feature data may be, for example, data indicating a position in a three-dimensional model used to draw the first face image 910 and the second face image 920. That is, the feature data may be data indicating the position of the feature in the three-dimensional model. Note that, in this case, for example, the feature data generation unit 108 generates the feature data by converting a position pointed by the pointer 950 when the determination operation is performed into a position in the three-dimensional model. The feature data generation unit 108 stores the generated feature data in the feature data storage unit 109.

The feature data storage unit 109 stores the feature data generated by the feature data generation unit 108 on the basis of an input from a user. Although the feature data storage unit 109 is included in the feature setting apparatus 100 in the configuration illustrated in FIG. 3, the feature data storage unit 109 may be realized in another apparatus communicably connected to the feature setting apparatus 100 via a network or the like. In addition, the feature data storage unit 109 may be configured as a database.

The data stored in the feature data storage unit 109 can be used for any purpose. That is, the purpose of the work in which the user designates the position of the feature is arbitrary and is not limited to a specific purpose. For example, the feature data may be used for collation of a person using a face image. Specifically, the feature setting apparatus 100 may be used to identify which of the known persons the unknown person corresponds to by collating the position of the feature of the face of the unknown person with the position of the feature of the face of each of the plurality of known persons. In this case, the apparatus may be used to register the position of the feature of the known person in the database in advance, or the apparatus may be used to input the position of the feature of the unknown person to be compared with the position of the feature stored in the database to the collation system. The use of the feature data is not limited to the image collation. For example, feature data may be collected to generate new data from the feature data. For example, feature data may be collected to generate statistical data of the positions of features. As described above, the purpose of the work in which the user designates the position of the feature is arbitrary.

Figure 5:
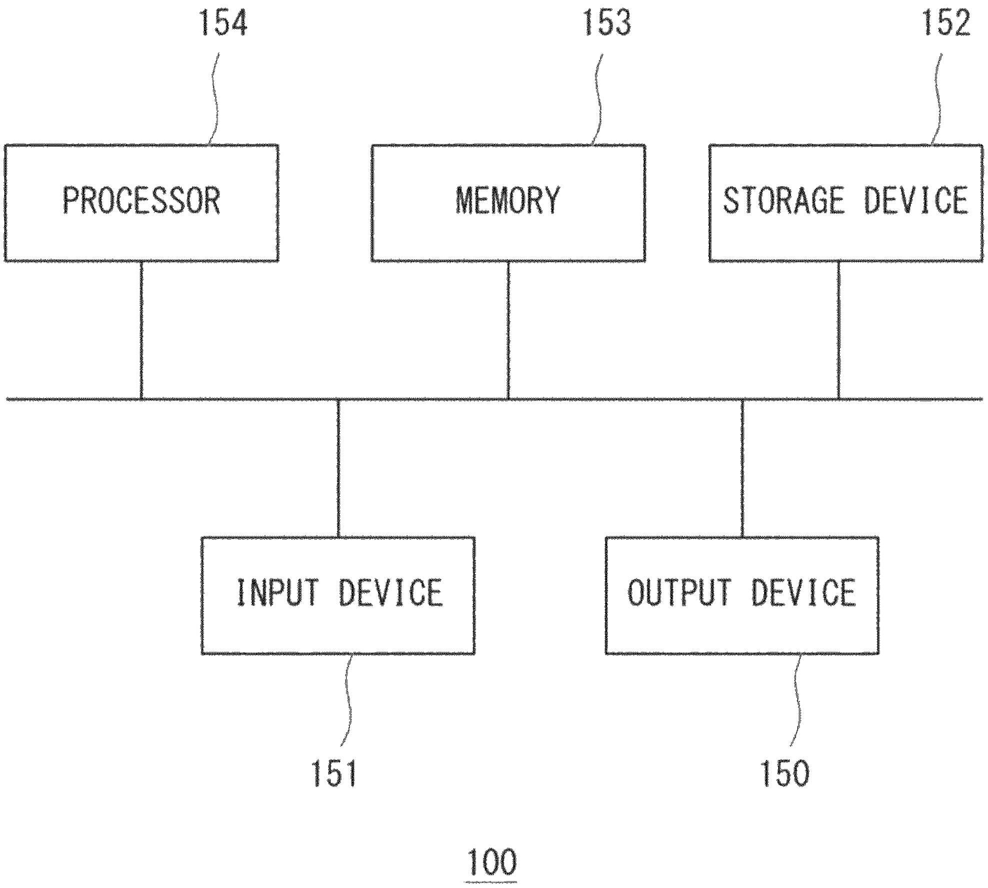
FIG. 5 is a block diagram illustrating an example of a hardware configuration of the feature setting apparatus according to the first example embodiment.

FIG. 5 is a block diagram illustrating an example of a hardware configuration of the feature setting apparatus 100. As illustrated in FIG. 5, the feature setting apparatus 100 includes an output device 150, an input device 151, a storage device 152, a memory 153, and a processor 154.

The output device 150 is an output device such as a display that outputs information to the outside. The display may be, for example, a flat panel display such as a liquid crystal display, a plasma display, or an organic electro-luminescence (EL) display. The output device 150 displays a GUI provided by the display control unit 107.

The input device 151 is a device for a user to perform input via a GUI, and is an input device including a pointing device. Examples of the pointing device include a mouse, a trackball, a touch panel, and a pen tablet. The input device 151 and the output device 150 may be integrally configured as a touch panel. The input device 151 may include a device other than a pointing device such as a keyboard.

The storage device 152 is a non-volatile storage device such as a hard disk or a flash memory. The model data storage unit 101 and the feature data storage unit 109 described above are realized by, for example, the storage device 152, but may be realized by another storage device.

The memory 153 includes, for example, a combination of a volatile memory and a non-volatile memory. The memory 153 is used for storing software (a computer program) including one or more instructions to be executed by the processor 154, data used for various processes of the feature setting apparatus 100, and the like.

The processor 154 reads and executes the software (the computer program) from the memory 153 to perform the feature setting apparatus 100 described above. The processor 154 may be, for example, a microprocessor, a micro processor unit (MPU), a central processing unit (CPU), or the like. The processor 154 may include a plurality of processors.

As described above, the feature setting apparatus 100 has a function as a computer.

The program includes a group of commands (or software codes) for causing a computer to perform one or more functions that have been described in the example embodiments when the program is read by the computer. The program may be stored in a non-transitory computer readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technology, a CD-ROM, a digital versatile disc (DVD), a Blu-ray (registered trademark) disc or any other optical disk storage, a magnetic cassette, a magnetic tape, a magnetic disk storage, and any other magnetic storage devices. The program may be transmitted on a transitory computer-readable medium or a communication medium. By way of example, and not limitation, transitory computer-readable or communication media include electrical, optical, acoustic, or other forms of propagated signals.

Figure 6:
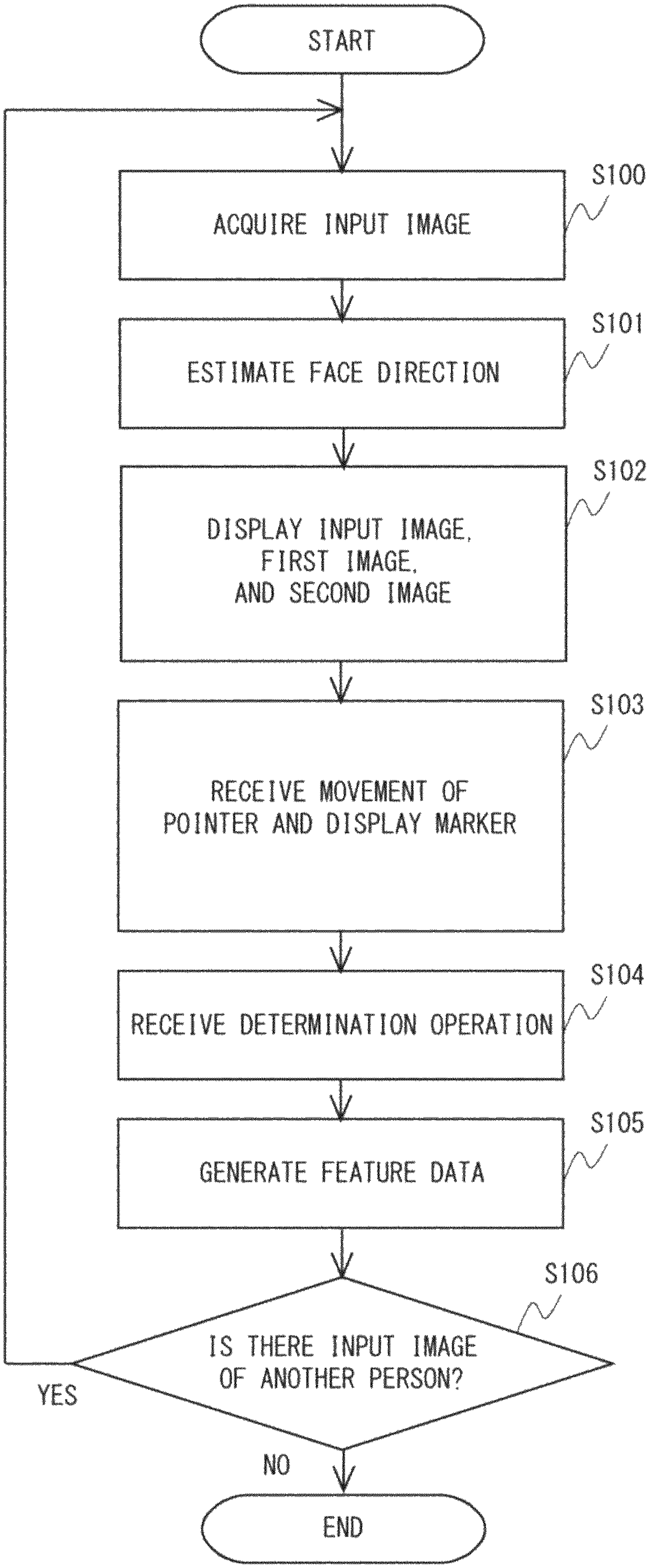
FIG. 6 is a flowchart illustrating an example of an operation of the feature setting apparatus according to the first example embodiment.

Next, an operation of the feature setting apparatus 100 will be described with reference to a flowchart. FIG. 6 is a flowchart illustrating an example of the operation of the feature setting apparatus 100. Hereinafter, the flow of the operation of the feature setting apparatus 100 will be described with reference to FIG. 6.

In step S100, the input image acquisition unit 105 acquires the input image 930 in which the face of a person having the feature is reflected on the surface of the face.

Next, in step S101, the estimation unit 106 estimates the direction in which the face appearing in the input image 930 acquired in step S100 faces.

Next, in step S102, the display control unit 107 controls the output device 150 to display a GUI including the input image 930, the first face image 910, and the second face image 920. At that time, the display control unit 107 performs control to display an image of the face facing the direction estimated in step S101 as the first face image 910. However, in a case where the parameter operation reception unit 102 receives the change operation for the parameter, the display control unit 107 may perform control to display the first face image 910 drawn according to the designated parameter.

Then, in step S103, the movement operation reception unit 103 receives the movement operation of the pointer 950.

In a case where the pointer 950 is present on one of the first face image 910 and the second face image 920 on the GUI screen, the display control unit 107 performs control to interlockingly display the marker 951 on the other face image in real time. Note that, as described above, the display control unit 107 may further perform control to display the marker 952 at the position pointed by the pointer 950.

Next, in step S104, the determination operation reception unit 104 receives an operation of determining the position pointed by the pointer 950 as the position of the feature existing on the surface of the face.

Next, in step S105, the feature data generation unit 108 generates feature data having the position pointed by the pointer 950 when the determination operation is performed as the position of the feature, and stores the feature data in the feature data storage unit 109.

Next, in step S106, the input image acquisition unit 105 determines whether there is an input image of the next person. That is, the input image acquisition unit 105 determines whether there is an input image of another person whose feature position should be designated. In a case where there is an input image of another person, the process returns to step S100, and the above-described process is repeated. On the other hand, when there is no input image of another person, the process ends.

The first example embodiment has been described above. According to the feature setting apparatus 100, the user can determine the position of the feature 91 after confirming in real time the position pointed by the pointer 950 in the face image in a certain direction corresponds to which position in the face image in another direction. Therefore, according to the feature setting apparatus 100, it is possible to accurately and efficiently perform the work of designating the position of the feature existing on the surface of the face by the user.

Second Example Embodiment

Next, a second example embodiment will be described. The second example embodiment is different from the first example embodiment in that information for enabling designation of a more accurate position of a feature is further displayed on the GUI. Hereinafter, differences from the first example embodiment will be specifically described, and redundant description will be omitted as appropriate.

Figure 7:
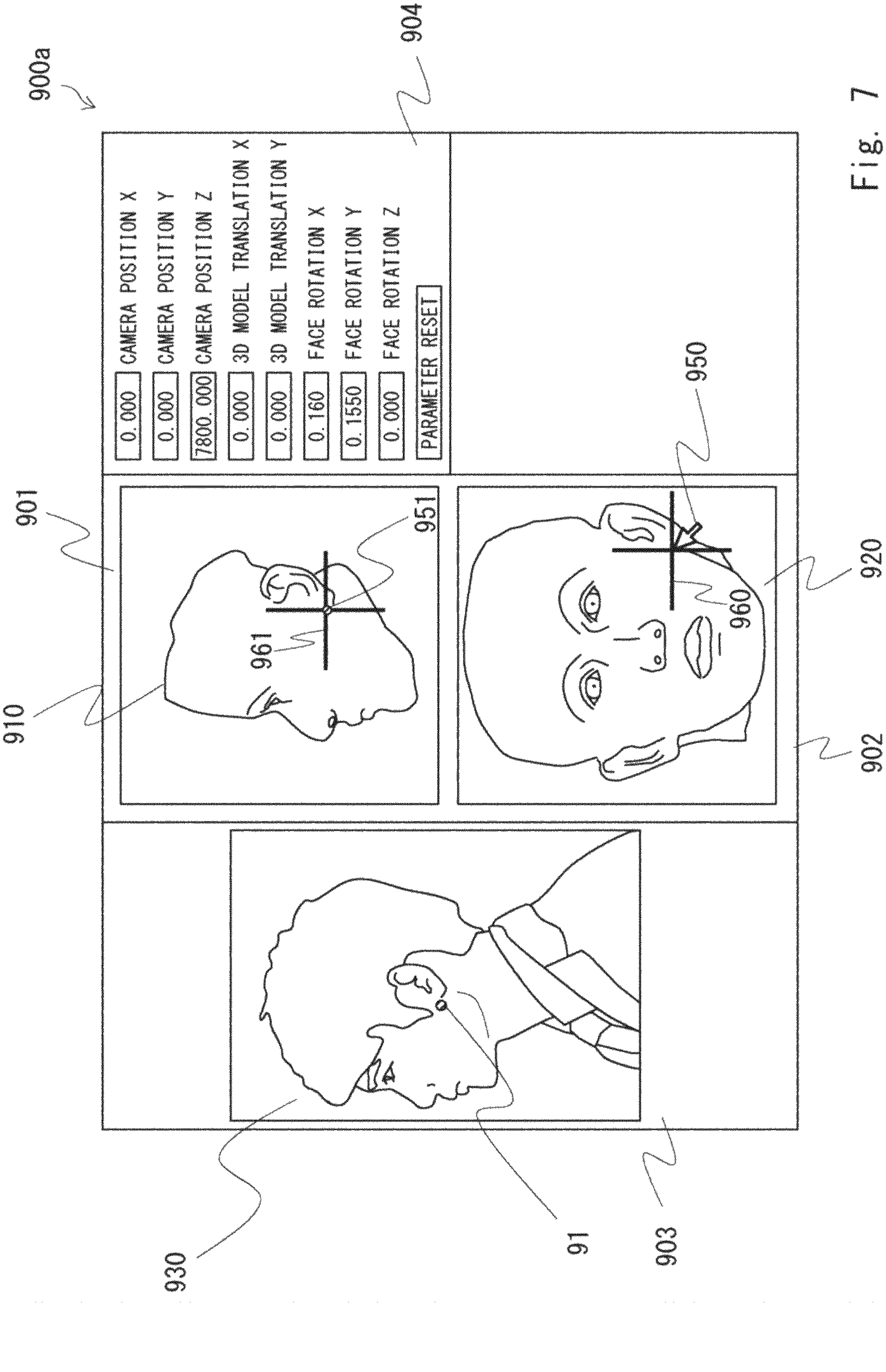
FIG. 7 is a schematic diagram illustrating an example of a GUI screen displayed on an output device by a display control unit according to a second example embodiment.

The display control unit 107 according to the second example embodiment is different from the display control unit 107 according to the first example embodiment in further displaying information indicating a positional relationship between a position pointed by a pointer and a component of the face. Note that the component of the face refers to, for example, a component of the face commonly present in a human face such as an eye, an eyebrow, a nose, a mouth, and an ear, but may include a feature of a face surface. Hereinafter, the display control unit 107 according to the second example embodiment will be specifically described. FIG. 7 is a schematic diagram illustrating an example of a GUI screen 900*a* displayed on the output device 150 by the display control unit 107 according to the second example embodiment. The GUI screen 900*a* illustrated in FIG. 7 is different from the GUI screen 900 illustrated in FIG. 4 in that display of cross lines 960 and 961 is added. That is, the display control unit 107 performs control to display the cross lines 960 and 961 as information indicating the positional relationship between the position pointed by the pointer and the component of the face. Note that, in the following description, information indicating a positional relationship between a position pointed by a pointer and a component of the face is also referred to as auxiliary information.

As illustrated in FIG. 7, in the present example embodiment, the display control unit 107 further controls to display the cross lines 960 and 961. Note that the display control unit 107 may perform control to display only one of the cross line 960 and the cross line 961.

The cross line 960 is a cross line centered on a position pointed by the pointer 950. In addition, the cross line 961 is a cross line centered on the position of the marker 951 displayed in conjunction with the pointer 950 on a face image different from the face image in which the pointer 950 exists. Each of these cross lines is a cross line in which a line in the vertical direction (the longitudinal direction of the face) and a line in the horizontal direction (the lateral direction of the face) intersect. Each of two lines intersecting each other constituting the cross line has a predetermined length as a length from the center of the cross line to the end of the line. Note that the predetermined length preferably has, for example, a length of at least ¼ or more of the face length so that the positional relationship between the center of the cross line (that is, the intersection of two intersecting lines) and the component of the face can be easily visually understood. Further, even if the pointer 950 is located at one end of the face, the predetermined length described above is more preferably equal to or longer than the face length so that the cross line reaches the other end of the face. Note that the face length refers to the face length in the vertical direction (the longitudinal direction of the face) with respect to a line in the vertical direction (the longitudinal direction of the face), and refers to the face length in the horizontal direction (the lateral direction of the face) with respect to a line in the horizontal direction (the lateral direction of the face).

Figure 8:
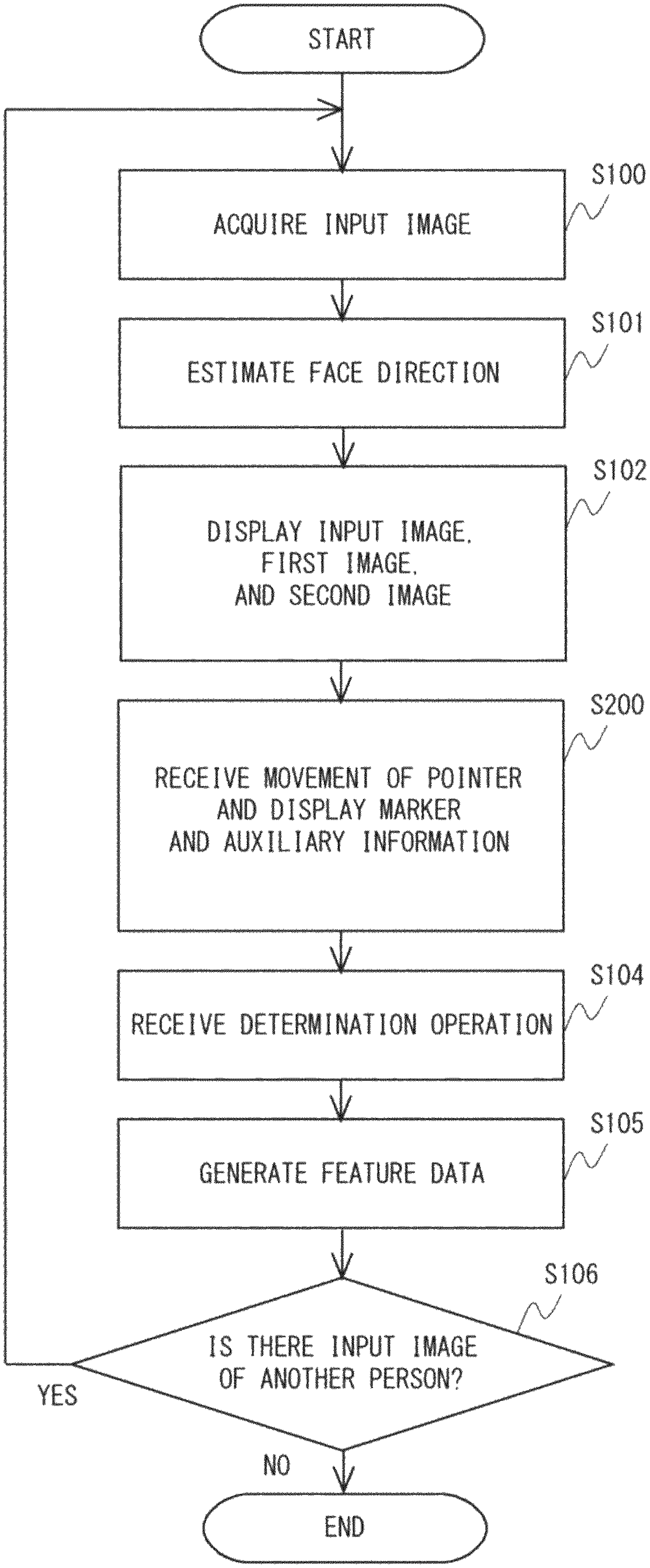
FIG. 8 is a flowchart illustrating an example of an operation of the feature setting apparatus according to the second example embodiment.

Next, an operation of the feature setting apparatus 100 according to the second example embodiment will be described with reference to a flowchart. FIG. 8 is a flowchart illustrating an example of an operation of the feature setting apparatus 100 according to the second example embodiment. As illustrated in FIG. 8, the flowchart shown here is different from the flowchart illustrated in FIG. 6 in that step S200 is executed instead of step S103. Hereinafter, differences from the flowchart illustrated in FIG. 6 will be described.

In the flowchart illustrated in FIG. 8, after step S102, the process proceeds to step S200. In step S200, in addition to the processing in step S103 described above, the auxiliary information is further displayed. The display control unit 107 controls to display the auxiliary information in real time according to the position of the pointer 950. In the GUI example of FIG. 7, in step S200, the display control unit 107 further controls to display the cross lines 960 and 961 in the GUI. After step S200, the process returns to step S104. The process after step S104 is similar to the process of the flowchart illustrated in FIG. 6.

The second example embodiment has been described above. In the present example embodiment, the display control unit 107 controls further to display information indicating a positional relationship between a position pointed by a pointer and a component of the face. Therefore, the user can designate the position of the feature after confirming the positional relationship between the feature and the component of the face. Therefore, it is possible to designate a more accurate position of the feature. In particular, as described above, the display control unit 107 displays the cross lines 960 and 961 on the GUI. Therefore, the user can visually and easily confirm the magnitude of the relative shift between the temporary position of the feature 91 indicated by the pointer 950 and the position of another component by comparing the position of the lines constituting the cross line with the position of another component. For example, in the example illustrated in FIG. 7, the user can visually and easily confirm the relative positional relationship between the nose position and the temporary position of the feature 91 indicated by the pointer 950 by using the cross lines 960 and 961. Note that, in order to further facilitate visual confirmation by the user, the display control unit 107 may further display another cross line similar to the cross lines 960 and 961 on the input image 930 in accordance with an instruction from the user via the input device 151.

Modified Example of Second Example Embodiment

Next, a modified example of the second example embodiment will be described. In the second example embodiment described above, the cross lines are displayed as the auxiliary information, but other information may be displayed as the auxiliary information. Hereinafter, differences from the above-described second example embodiment will be described, and redundant description will be appropriately omitted.

Figure 9:
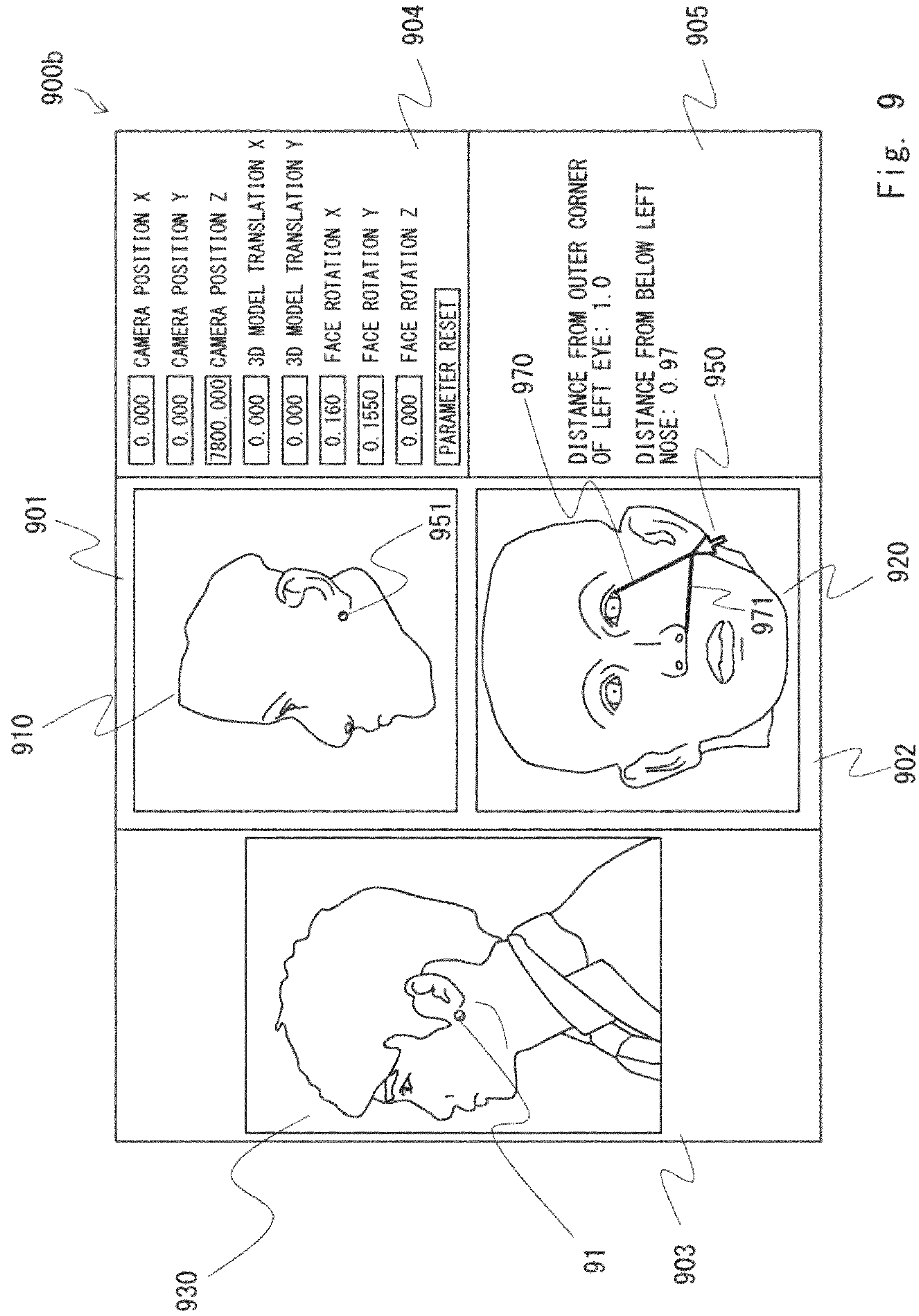
FIG. 9 is a schematic diagram illustrating an example of a GUI screen displayed on an output device by a display control unit according to a modified example of the second example embodiment.

FIG. 9 is a schematic diagram illustrating an example of a GUI screen 900*b* displayed on the output device 150 by the display control unit 107 according to the modified example of the second example embodiment. In the GUI screen 900*b* illustrated in FIG. 9, the distance between the position pointed by the pointer 950 and the position of a predetermined component of the face is displayed in a distance information display region 905 as the auxiliary information. Specifically, the distance from the position of the outer corner of the left eye to the position pointed by the pointer 950 and the distance from the position under the left nose to the position pointed by the pointer 950 are displayed as the auxiliary information. Note that the predetermined components of the face refer to predetermined ones among the above-described components of the face. Here, the eyes and the nose are cited as examples of the predetermined components, but the distance may be displayed using other components of the face. In this manner, the display control unit 107 may perform control to display the distance between the position pointed by the pointer 950 and the position of a predetermined component of the face. Note that, in this case, for example, the model data storage unit 101 stores a three-dimensional model including position information for each component. Then, the display control unit 107 calculates the distance between the position pointed by the pointer 950 and the position of the component on the face image using the position information of each component, and displays the calculated distance on the GUI. According to such auxiliary information, since the distance between the position of the component of the face and the temporary position of the feature can be clearly confirmed, the user can accurately confirm the relative positional relationship therebetween.

Further, in the GUI screen 900*b* illustrated in FIG. 9, a line connecting the position pointed by the pointer 950 and the position of a predetermined component of the face is displayed as the auxiliary information. Specifically, a line 970 connecting the position of the outer corner of the left eye and the position pointed by the pointer 950 and a line 971 connecting the position below the left nose and the position pointed by the pointer 950 are displayed as the auxiliary information. In this manner, the display control unit 107 may perform control to display a line connecting the position pointed by the pointer 950 and the position of a predetermined component of the face. Note that, also in this case, for example, the model data storage unit 101 stores a three-dimensional model including position information for each component. According to such auxiliary information, the user can visually confirm the direction from the position of the component of the face to the temporary position of the feature by the inclination of the lines 970 and 971, and thus, can easily confirm the relative positional relationship between the two.

The display control unit 107 may perform control to display auxiliary information regarding a positional relationship between a predetermined component and the pointer 950, or may perform control to display auxiliary information regarding a positional relationship between a component designated by the user and the pointer 950. Note that, as illustrated in FIG. 9, the display control unit 107 preferably displays the auxiliary information for a plurality of components. That is, the display control unit 107 preferably displays the auxiliary information regarding the positional relationship between each of the plurality of components and the pointer 950. This is because such display allows the user to determine the position of the feature after comparing the positional relationship between each component and the pointer 950. For example, the position of the feature can be determined by comparing the relative position of the feature with respect to the position of a first component (for example, the outer corner of the left eye) and the relative position of the feature with respect to the position of a second component (for example, below left nose). More specifically, for example, after confirming that the distance between the second component and the feature is shorter than the distance between the first component and the feature, the user can determine the position of the feature. In addition, after comparing the direction of the feature with respect to the first component and the direction of the feature with respect to the second component, the user can determine the position of the feature.

Note that, although FIG. 9 illustrates an example in which the auxiliary information indicating the positional relationship between the pointer 950 and the component on the face image in which the pointer 950 exists is displayed, the display control unit 107 may perform control to display the auxiliary information indicating the positional relationship between the marker 951 and the component on the face image in which the marker 951 exists. The display control unit 107 may display only a part of the cross line, the distance between the pointer and the component, and the line connecting the pointer and the component as the auxiliary information, or may display a combination thereof.

Although the invention of the present application has been described above with reference to the example embodiments, the invention of the present application is not limited to the above. Various modified examples that can be understood by those skilled in the art can be made to the configuration and details of the invention of the present application within the scope of the invention. For example, various example embodiments and various modified examples can be appropriately combined.

Some or all of the above example embodiments may be described as the following Supplementary Notes, but are not limited to the following.

Supplementary Note 1

A feature setting apparatus including:

a display control means for performing control to display a first face image and a second face image; and a movement operation reception means for receiving a movement operation of a pointer, in which in a case where the pointer on one of the first face image and the second face image moves, the display control means performs control to display a marker at a position on an other face image corresponding to a position of the pointer to be moved in conjunction with movement of the pointer.

Supplementary Note 2

The feature setting apparatus according to Supplement Note 1, in which the display control means performs control to display the marker in correspondence with a position of the pointer on an other face image by using movement of the pointer on one of the first face image and the second face image as a trigger.

Supplementary Note 3

The feature setting apparatus according to Supplementary Note 1 or 2, in which the display control means performs control to display information indicating a positional relationship between a position pointed by the pointer and a component of a face.

Supplementary Note 4

The feature setting apparatus according to Supplementary Note 3, in which the information includes a distance between a position pointed by the pointer and a position of a predetermined component of the face.

Supplementary Note 5

The feature setting apparatus according to Supplementary Note 3 or 4, in which the information includes a line connecting a position pointed by the pointer and a position of a predetermined component of the face.

Supplementary Note 6

The feature setting apparatus according to Supplementary Note 4 or 5, in which the display control means performs control to display the information for a plurality of predetermined components of the face.

Supplementary Note 7

The feature setting apparatus according to any one of Supplementary Notes 3 to 6, in which the information includes a cross line centered on a position pointed by the pointer.

Supplementary Note 8

The feature setting apparatus according to any one of Supplementary Notes 1 to 7, in which in a case where the pointer exists in a portion having a drawing area smaller than that of other portions of a surface of a face among portions of the surface of the face, the movement operation reception means reduces a movement speed of the pointer as compared with a case where the pointer exists in the other portions.

Supplementary Note 9

The feature setting apparatus according to any one of Supplementary Notes 1 to 8, further including:

a parameter operation reception means for receiving a change operation for a parameter for drawing the first face image, wherein at least the first face image is drawn based on a three-dimensional model of a face, the parameter includes at least one of a parameter for controlling rotation of the three-dimensional model, a parameter for setting a viewpoint for drawing the three-dimensional model as the first face image, or a parameter for setting an arrangement position of the face in the first face image, and the display control means performs control to display the first face image drawn according to the parameter.

Supplementary Note 10

The feature setting apparatus according to any one of Supplementary Notes 1 to 9, in which the first face image is an image of a face facing a first direction, and the second face image is an image of a face facing a second direction.

Supplementary Note 11

The feature setting apparatus according to any one of Supplementary Notes 1 to 10, further including:

an input image acquisition means for acquiring an input face image, in which the display control means further performs control to display the input face image, the first face image, and the second face image.

Supplementary Note 12

The feature setting apparatus according to Supplementary Note 10, further including:

an input image acquisition means for acquiring an input face image; and an estimation means for estimating a direction in which a face of the input face image faces, wherein the display control means performs control to display the first face image with an estimated direction as the first direction.

Supplementary Note 13

The feature setting apparatus according to any one of Supplementary Notes 1 to 12, in which the second face image is an image in which a texture of a three-dimensional model of a face is developed two-dimensionally.

Supplementary Note 14

A feature setting method including:

displaying a first face image and a second face image;

receiving a movement operation of a pointer;

in a case where the pointer on one of the first face image and the second face image moves; and displaying a marker at a position on an other face image corresponding to a position of the pointer to be moved in conjunction with movement of the pointer.

Supplementary Note 15

A non-transitory computer readable medium having a program stored thereon for causing a computer to execute:

a display control step of controlling to display a first face image and a second face image; and a movement operation reception step of receiving a movement operation of a pointer, in which in the display control step, in a case where the pointer on one of the first face image and the second face image moves, a marker is controlled to be displayed at a position on an other face image corresponding to a position of the pointer to be moved in conjunction with movement of the pointer.

REFERENCE SIGNS LIST

1 FEATURE SETTING APPARATUS
2 DISPLAY CONTROL UNIT
3 MOVEMENT OPERATION RECEPTION UNIT
90 PERSON
91 FEATURE
92 FACE IMAGE
93 RANGE
100 FEATURE SETTING APPARATUS
101 MODEL DATA STORAGE UNIT
102 PARAMETER OPERATION RECEPTION UNIT
103 MOVEMENT OPERATION RECEPTION UNIT
104 DETERMINATION OPERATION RECEPTION UNIT
105 INPUT IMAGE ACQUISITION UNIT
106 ESTIMATION UNIT
107 DISPLAY CONTROL UNIT
108 FEATURE DATA GENERATION UNIT
109 FEATURE DATA STORAGE UNIT
150 OUTPUT DEVICE
151 INPUT DEVICE
152 STORAGE DEVICE
153 MEMORY
154 PROCESSOR
900, 900*a*, 900*b* GUI SCREEN
901 FIRST DRAWING REGION
902 SECOND DRAWING REGION
903 INPUT IMAGE DISPLAY REGION
904 PARAMETER DISPLAY REGION
905 DISTANCE INFORMATION DISPLAY REGION
910 FIRST FACE IMAGE
920 SECOND FACE IMAGE
930 INPUT IMAGE
950 POINTER
951, 952 MARKER
960, 961 CROSS LINE
970, 971 LINE

What is claimed is:

1. A feature setting apparatus comprising:

at least one memory storing instructions; and at least one processor configured to execute the instructions to:

perform control to display a first face image and a second face image;

receive a movement operation of a pointer; and in a case where the pointer on one of the first face image and the second face image moves, perform control to display a marker at a position on an other face image corresponding to a position of the pointer to be moved in conjunction with movement of the pointer, wherein the at least one processor is further configured to execute the instructions to perform control to display information indicating a positional relationship between a position pointed by the pointer and a component of a face, and wherein the information includes a cross line centered on the position pointed by the pointer.

2. The feature setting apparatus according to claim 1, wherein the at least one processor is further configured to execute the instructions to perform control to display the marker in correspondence with a position of the pointer on an other face image by using movement of the pointer on one of the first face image and the second face image as a trigger.

3. The feature setting apparatus according to claim 1, wherein the information includes a distance between a position pointed by the pointer and a position of a predetermined component of the face.

4. The feature setting apparatus according to claim 1, wherein the information includes a line connecting a position pointed by the pointer and a position of a predetermined component of the face.

5. The feature setting apparatus according to claim 3, wherein the at least one processor is further configured to execute the instructions to perform control to display the information for a plurality of predetermined components of the face.

6. The feature setting apparatus according to claim 1, wherein the at least one processor is further configured to execute the instructions to, in a case where the pointer exists in a portion having a drawing area smaller than that of other portions of a surface of a face among portions of the surface of the face, reduce a movement speed of the pointer as compared with a case where the pointer exists in the other portions.

7. The feature setting apparatus according to claim 1, wherein the at least one processor is further configured to execute the instructions to receive:

a change operation for a parameter for drawing the first face image, at least the first face image is drawn based on a three-dimensional model of a face, wherein the parameter includes at least one of a parameter for controlling rotation of the three-dimensional model, a parameter for setting a viewpoint for drawing the three-dimensional model as the first face image, or a parameter for setting an arrangement position of the face in the first face image, and wherein the at least one processor is further configured to execute the instructions to perform control to display the first face image drawn according to the parameter.

8. The feature setting apparatus according to claim 1, wherein the first face image is an image of a face facing a first direction, and the second face image is an image of a face facing a second direction.

9. The feature setting apparatus according to claim 1, wherein the at least one processor is further configured to execute the instructions to:

acquire an input face image, and perform control to display the input face image, the first face image, and the second face image.

10. The feature setting apparatus according to claim 8, wherein the at least one processor is further configured to execute the instructions to:

acquire an input face image;

estimate a direction in which a face of the input face image faces; and perform control to display the first face image with an estimated direction as the first direction.

11. The feature setting apparatus according to claim 1, wherein the second face image is an image in which a texture of a three-dimensional model of a face is developed two-dimensionally.

12. A feature setting method comprising:

displaying a first face image and a second face image;

receiving a movement operation of a pointer;

in a case where the pointer on one of the first face image and the second face image moves;

displaying a marker at a position on an other face image corresponding to a position of the pointer to be moved in conjunction with movement of the pointer; and displaying information indicating a positional relationship between a position pointed by the pointer and a component of a face, wherein the information includes a cross line centered on the position pointed by the pointer.

13. A non-transitory computer readable medium having a program stored thereon for causing a computer to execute:

a display control step of controlling to display a first face image and a second face image; and a movement operation reception step of receiving a movement operation of a pointer, wherein in the display control step, in a case where the pointer on one of the first face image and the second face image moves, a marker is controlled to be displayed at a position on an other face image corresponding to a position of the pointer to be moved in conjunction with movement of the pointer, wherein in the display control step, information indicating a positional relationship between a position pointed by the pointer and a component of a face is controlled to be displayed, and wherein the information includes a cross line centered on the position pointed by the pointer.

14. The feature setting apparatus according to claim 1, wherein each of two lines intersecting each other constituting the cross line has a predetermined length as a length from a center of the cross line to an end of the line, and wherein the predetermined length has a length of at least ¼ or more of a length of the face.

* * * * *